United States Patent [19]
Eriksson
[11] 4,340,131
[45] Jul. 20, 1982

[54] OPERATIONAL CONTROL SYSTEM FOR LIFT AND ELEVATOR MACHINERY

[75] Inventor: Arvid Eriksson, Stockholm, Sweden
[73] Assignee: Elevator GmbH, Baar, Switzerland

[21] Appl. No.: 218,080
[22] Filed: Dec. 19, 1980
[30] Foreign Application Priority Data
Dec. 28, 1979 [SE] Sweden ................................ 7910738
[51] Int. Cl.$^3$ ............................ B66B 1/32; H02P 3/26
[52] U.S. Cl. .................................. 187/29 R; 318/371; 318/758
[58] Field of Search .......... 187/29; 318/371, 757–760, 318/762

[56] References Cited

U.S. PATENT DOCUMENTS

| | | | |
|---|---|---|---|
| 2,994,025 | 7/1961 | Mitchell | 318/758 |
| 3,488,570 | 1/1970 | Vint, Jr. et al. | 318/371 X |
| 4,083,431 | 4/1978 | Oohira et al. | 187/29 |
| 4,151,453 | 4/1979 | Suzuki et al. | 318/762 |
| 4,181,197 | 1/1980 | Tanabe et al. | 187/29 |
| 4,225,813 | 9/1980 | Sahasrabudhe | 318/371 |

*Primary Examiner*—W. E. Duncanson, Jr.
*Attorney, Agent, or Firm*—Witherspoon & Hargest

[57] ABSTRACT

Operational control system for lift and elevator machinery adapted for electrodynamic braking, said operational control system being adapted to be connected to the machinery of existing lift or elevator equipment. The operational control system is designed for one-speed A.C. synchronous motors of the short-circuit type forming part of operational control units provided with a simple mechanical brake. The operational control system improves the stop-plane exactitude and reduces brake wear. In the operational control system electrodynamic and mechanical braking is combined, the control being performed via a reference voltage formed from an output signal received from a speed-sensing member.

2 Claims, 8 Drawing Figures

OPERATIONAL CONTROL SYSTEM FOR LIFT AND ELEVATOR MACHINERY

Figure 1:
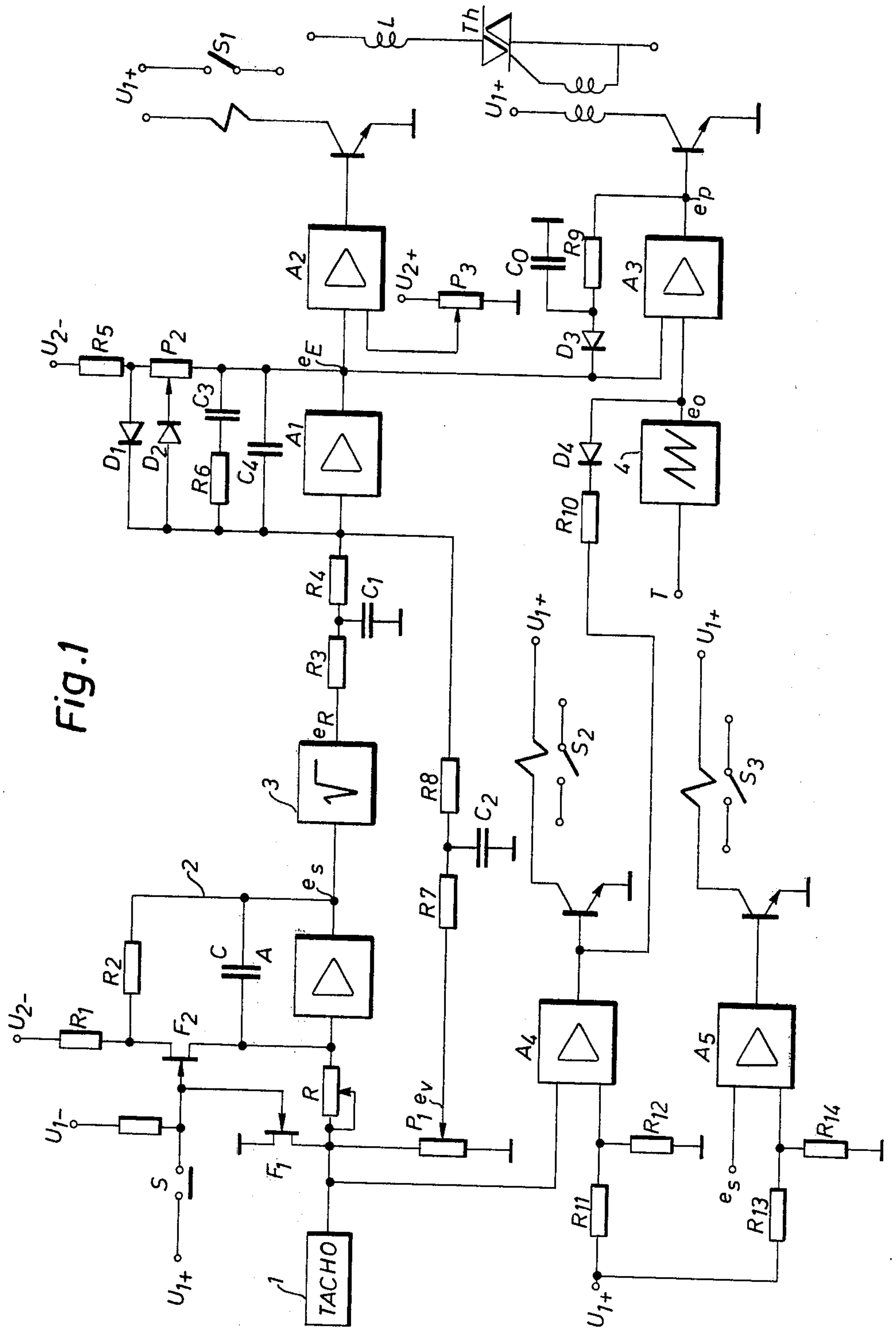

The present invention refers to an operational control system for lift and elevator machinery and particularly refers to an operational control system for electrodynamic braking adapted to be connected to the machinery of existing lift or elevator equipment. The operational control system according to the invention is intended to be used in connection with a one-speed A.C. synchronous motor of the short-circuit type forming part of a machinery provided with a simple mechanical brake.

In older lift and elevator equipments provided with a machinery of the one-speed type comprising a mechanical brake braking is performed directly from full speed by means of mechanical braking this means that the wear of the brake linings will be rather great in particular at braking speeds up to 0.7 m/sec. In this type of mechanical braking the levelling exactitude or stop-plane exactitude will be low, for example ±35 mm or more. A level difference of this order of magnitude between the bottom of the lift cage and the stop plane involves problems for passengers using invalid carriages. Recently authorities and institutions have shown increasing interest for invalidity problems. In this connection the Swedish building standards recommend a stop plane deviation of at most ±10 mm. The Swedish building code requires a threshold height of at most 25 mm. In order to improve the stop plane exactitude and to reduce wear it is possible to make use of the electrodynamic braking properties of a two-speed motor. The lift is stopped by shifting over the current supply to the motor from the high-speed winding to the low-speed winding. This is performed at a certain spacing from the stop plane. The motor feed is interrupted when the speed of the lift has reached about 0.2 m/sec. and at this speed the mechanical brake takes over. If the above mentioned solution is used in order to remove the drawbacks of an exclusively mechanical braking this means that the existing one-speed motor either must be complemented by an additional fine-adjusting equipment or must be replaced by a two-speed motor which cannot be considered to be economically acceptable.

It is a purpose of the present invention to provide an operational control system for lifts and elevators (speed 0.6–0.7 m/sec.) which are provided with mechanically braked one-speed A.C. synchronous motors, this novel system being of a simple construction and yielding high stop plane exactitude. A further purpose of the invention is to use the existing brake of the lift in order additionally to increase the braking effect if the available electrodynamic braking effect is too low due to the rated output of the motor or to accidental overload.

It is a further purpose of the invention to bring about a retardation which is comfortable for the passengers while at the same time the wear of the mechanical brake is kept on a low level which means a reduced number of servicing times.

In accordance with the invention all the above purposes are satisfied by providing means for sensing the speed of the lift, the speed output signal from the sensing member being compared to a reference output signal as derived from the same speed output signal in order to control a linear speed change in time during braking of the lift towards a stop plane, the braking comprising both electrodynamic and mechanical braking.

Figure 2:
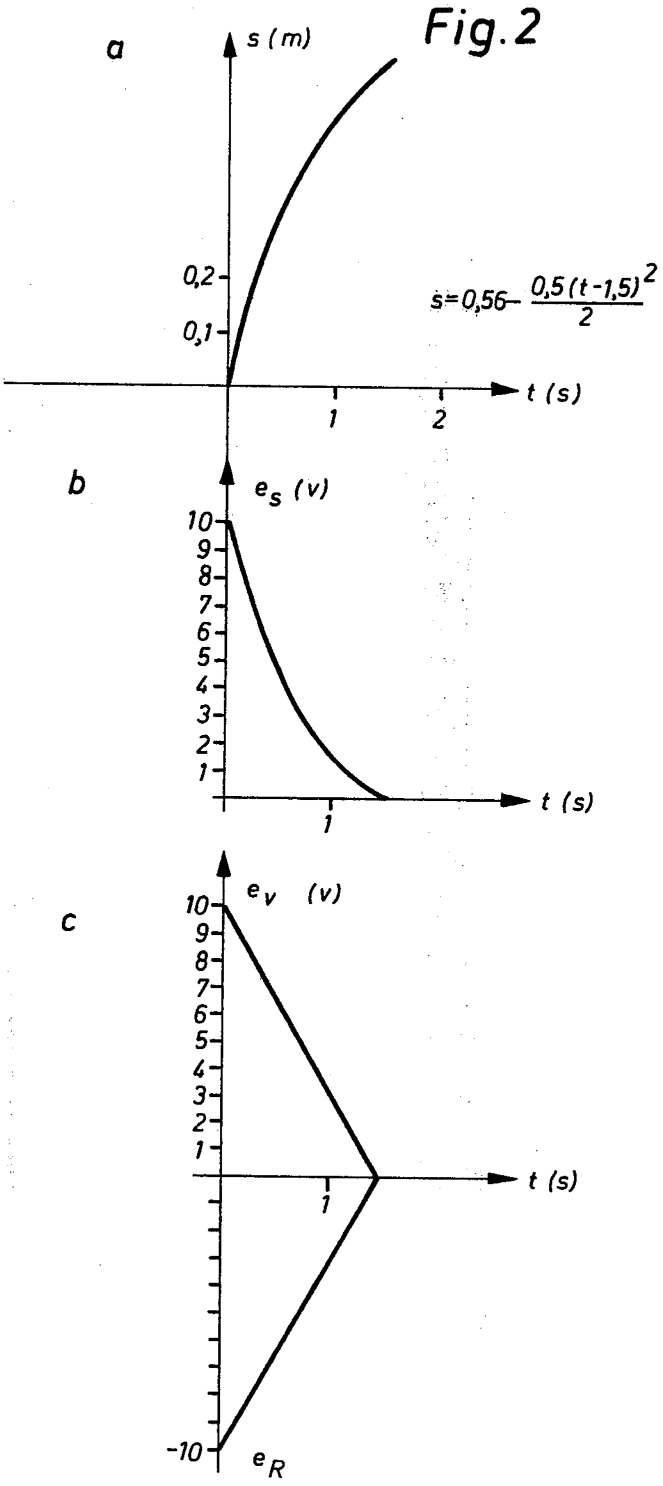

An embodiment of the invention will be described hereafter by reference to the attached drawings in which FIG. 1 is a block diagram showing the control electronics of the braking system according to a preferred embodiment of the invention;

FIG. 2 is a time diagram of an idealized braking process where

Figure 3:
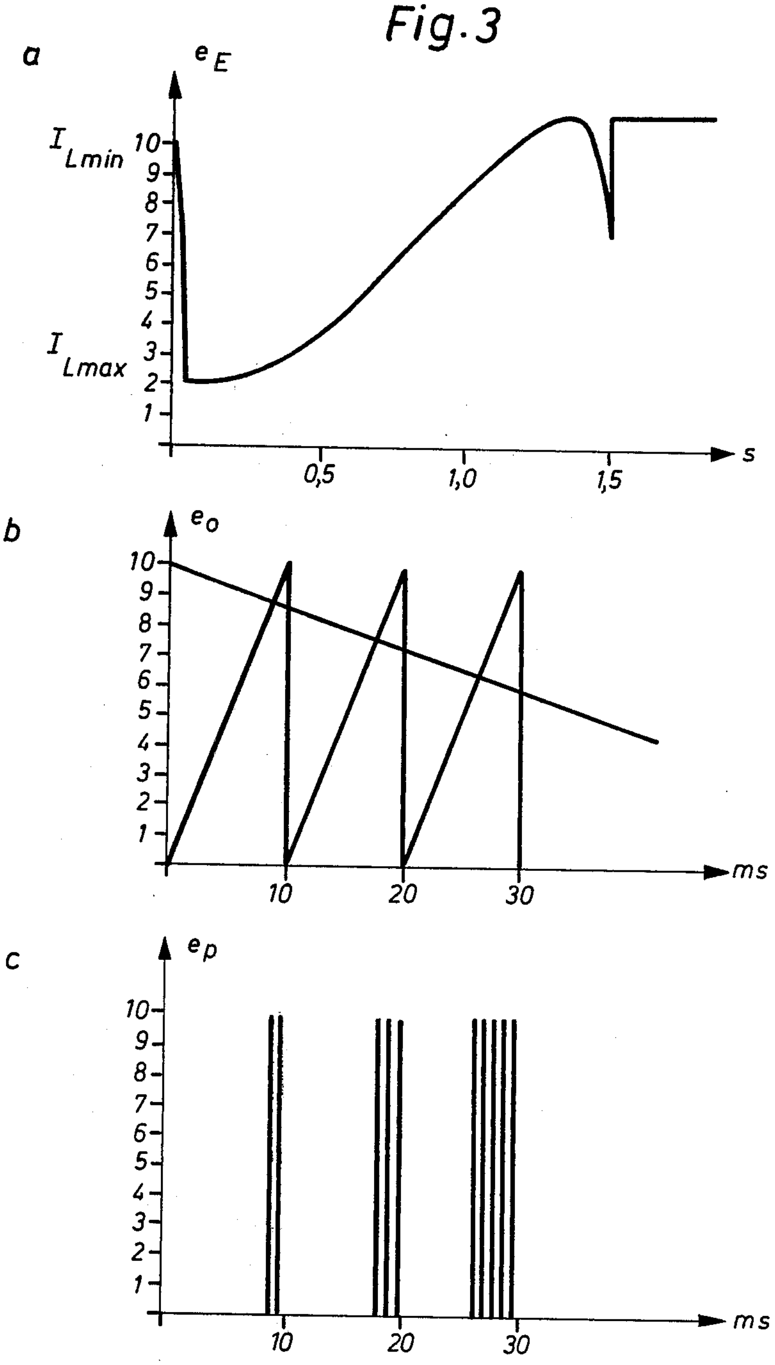

FIG. 2a shows the retardation distance as a function of time during braking from 0.7 m/sec. to standstill with a retardation of 0.5 m/sec$^2$, FIG. 2b shows the output voltage from an integrator yielding an electric output signal proportional to the retardation distance passed, FIG. 2c shows in the upper half of the diagram the output voltage from the device sensing the number of revolutions and in the lower half of the diagram the output signal from the device producing the reference signal and consisting of an analogue root-extracting circuit, FIG. 3a shows the output signal from the fault signal comparator as a function of time, FIG. 3b shows the output signal from a pilot oscillator thyristor control of the braking flow in the A.C. asynchronous machine, FIG. 3c represents shower control pulses as a function of time resulting from comparison between pilot oscillator voltage and fault output signal.

By reference to the block diagram of FIG. 1 an embodiment of the braking system according to the invention will now be described. A contact S which is actuated from the keyboard in the lift cage is closed at a certain distance from the desired stop plane. The field effect transistors $F_1$ and $F_2$ operating as switches are rendered non-conductive and the output voltages of intergrator *3a* which is determined by resistance $R_1$ and $R_2$ starts falling from this starting output voltage value (10 Volt) according to the integrator formula:

$$e_s = -\frac{1}{RC}\int e_{tacho}dt$$

where $e/_{tacho}$ is the output voltage from a tachometer 1 connected to the drive shaft of the lift motor and RC the time constant of the integrator. The output voltage of the integrator corresponds to the distance which the lift will pass during the retardation because:

$$s = \int_o^{t_r} v(t)dt$$

where s is the braking distance and $t_r$ is the retardation time, v(t) thus corresponding to $e/_{tacho}(t)$. Constant retardation is desirable and a retardation course with constant retardation is shown in FIG. *2a.* When the retardation is constant, i.e. the braking force is constant, there is obtained an output signal from integrator $e_2$ according to FIG. *2b* having a starting value of 10 V. $e_s$ is a second-grade function in respect to time and in order to enable it to be used as a speed reference a conversion of $e_s(t)$ is performed to a linear function $e_R(t)$ in the root extracting circuit *3a* (see FIG. 1) according to FIG. *2c.* The signal $e_R(t)$ is fed via a filter $R_3C_1R_4$ to the input of a control amplifier $A_2$ with the feedback circuit $R_6C_3$, $C_4$. The output signal from the tachometer 1 is fed via a voltage divider $P_1$ into the same input via a filter $R_7C_2R_8$ and the tachometer signal is so adjusted that its value at the moment of braking is of the same order of magnitude as the output signal from the root extracting circuit 3.

If $e_v=-e_r$ and the sum of the resistances $R_3$ and $R_4$ equals the sum of the resistances $R_7$ and $R_8$, the resulting current in the operational amplifier $A_1$ will equal 0 and the output signal from the control amplifier $A_1$ is determined by $R_5$ and the adjustment of the potentiometer $P_2$. In the braking moment $E_r$ and $E_v$ have the same amount. If after some msec. the tachometer signal has an amount slightly greater than the integrated speed value, a positive difference integration voltage will appear on the PI-amplifier $A_1$ (Proportional Integral). This causes the output voltage $e_E$ to decrease (compare FIG. 3a) which means that an increasing number of shower pulses (compare FIG. 3c) is obtained on the control of the thyristor $T_h$ which is series-connected to the motor winding L of the driving motor. An increase of the control pulses to the thyristor yields an increased braking current to the motor winding L and accordingly an increased retardation. An excessive retardation, on the other hand, yields a negative input signal to amplifier $A_1$ which causes the braking current to the motor winding L to decrease. In the above described way the retardation is kept closely constant irrespective of the load of the lift. In certain types of lift machineries, due to the load-rated output of the drive motor, the D.C. braking is not sufficient in connection with heavier load. According to the invention, this problem is solved by means of comparing amplifier $A_2$ one input of which is connected to the output of the control amplifier $A_1$ where the other input is connected to a voltage level given by a potentiometer $P_4$ corresponding to the available maximum D.C. braking effect. Thus, the desired retardation curve can be obtained by simultaneous mechanical and electrodynamic braking. The operation of the mechanical brake is performed by activating switch $S_1$.

When the lift approaches the stop plane in a time process which is ideal according to FIG. 2a, the thyristor is preferably blocked when a predetermined low speed has been achieved which is determined by the comparing amplifier $A_4$ the output of which is connected via a diode $D_4$ and a resistance $R_{10}$ to the output of the saw tooth generator 4. The one input of $A_4$ is connected to the tachogenerator while the other one is connected to a voltage device $R_{11}$, $R_{12}$. When $A_4$ reverses, the motor is switched off via switch $S_2$ whereby also the input signal on $A_3$ is caused to cease. The locking of the lift is performed at a distance of 5 mm from the stop plane provided that a low value $e_s$ is detected by the comparing amplifier $A_5$, one input of which is connected to the output of the integrator 2 and the other input of which is connected to a voltage divider $R_{13}$, $R_{14}$. The output signal from said voltage divider determines the locking point. When comparator $A_5$ is reversed, switch $S_3$ is activated to operate the locking brake.

I claim:

1. Operational control system for electrodynamic braking of lift and elevator machinery, said machinery comprising a one-speed A.C. asynchronous motor of the short-circuit type equipped with a mechanical brake, characterized by means for sensing the speed of the lift, a D.C. source for feeding the field windings of the A.C. asynchronous motor to produce a rectified magnetic braking flow through the rotor of the said asynchronous motor to produce electrodynamic braking, and integrating means for integrating the output signal from the member sensing the number of rotations to generate a reference signal for the retardation distance, and converting means having a root-extracting function to linearize the reference signal for the retardation distance, first comparator means for comparing the output signal indicating the number of revolutions with the linearized signal for the retardation distance to produce a fault signal for controlling an electric control signal for said D.C. direct current source, second comparator means for comparing the fault signal with a reference level corresponding to the available maximum electrodynamic braking to produce a signal for activating existing mechanical brake in said machinery.

2. Operational control system as claimed in claim 1, characterized in that the speed sensing member is a tachometer connected to the shaft of the lift driving motor.

* * * * *